United States Patent
Yoneshima et al.

(10) Patent No.: US 9,217,808 B2
(45) Date of Patent: Dec. 22, 2015

(54) WELLBORE SIGNAL MONITOR WITH TANGENTIAL SEISMIC SENSORS FOR TUBE-WAVE NOISE REDUCTION

(71) Applicant: Schlumberger Technology Corporation, Sugar Land, TX (US)

(72) Inventors: Shinji Yoneshima, Sagamihara (JP); Sogo Kuroiwa, Kawasaki (JP); Toru Ikegami, Machida (JP); Tatsuki Endo, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 8 days.

(21) Appl. No.: 14/073,874

(22) Filed: Nov. 7, 2013

(65) Prior Publication Data
US 2015/0124562 A1 May 7, 2015

(51) Int. Cl.
| | |
|---|---|
| *G01V 1/52* | (2006.01) |
| *G01V 1/46* | (2006.01) |
| *G01V 1/40* | (2006.01) |
| *G01V 1/42* | (2006.01) |
| *G01V 1/44* | (2006.01) |

(52) U.S. Cl.
CPC ........................................ *G01V 1/40* (2013.01)

(58) Field of Classification Search
USPC ................... 181/104, 112, 122, 108
See application file for complete search history.

(56) References Cited

U.S. PATENT DOCUMENTS

| | | | | |
|---|---|---|---|---|
| 4,524,434 | A * | 6/1985 | Silverman ........................ | 367/37 |
| 4,601,024 | A * | 7/1986 | Broding ........................... | 367/86 |
| 5,503,225 | A | 4/1996 | Withers | |
| 6,018,496 | A * | 1/2000 | Stanke et al. ................... | 367/35 |
| 6,179,066 | B1 | 1/2001 | Nasr et al. | |
| 6,181,642 | B1 | 1/2001 | Coates et al. | |
| 6,320,820 | B1 * | 11/2001 | Gardner et al. ................. | 367/81 |
| 6,370,082 | B1 * | 4/2002 | Gardner et al. ................. | 367/82 |
| 6,714,480 | B2 * | 3/2004 | Sinha et al. ..................... | 367/31 |
| 6,829,947 | B2 * | 12/2004 | Han et al. .................. | 73/861.19 |
| 6,981,550 | B2 | 1/2006 | Haheim et al. | |
| 7,463,550 | B2 * | 12/2008 | Sinha et al. ..................... | 367/25 |
| 7,529,152 | B2 * | 5/2009 | Sinha et al. ..................... | 367/31 |

(Continued)

FOREIGN PATENT DOCUMENTS

| | | |
|---|---|---|
| WO | 89/07774 | 8/1989 |
| WO | 00/75694 | 12/2000 |

(Continued)

OTHER PUBLICATIONS

International search report and written opinion for the equivalent PCT patent application No. PCT/US2014/064459 issued on Feb. 23, 2015.

*Primary Examiner* — Edgardo San Martin
(74) *Attorney, Agent, or Firm* — Daryl R. Wright; Jody DeStefanis

(57) ABSTRACT

A sensor array is positionable in a wellbore penetrating a subterranean formation. The sensor array includes a plurality of seismic sensors disposable about a perimeter of the wellbore and coupleable to a signal measurer with a configuration to provide three component seismic signal measurement within the wellbore. At least two of the seismic sensors are located at different azimuthal angles relative to one another and oriented tangentially to a longitudinal axis of the wellbore so as to receive tangential components of wellbore seismic signals to the exclusion of longitudinal and radial components of the wellbore seismic signals.

20 Claims, 6 Drawing Sheets

(56) References Cited

U.S. PATENT DOCUMENTS

| | | | |
|---|---|---|---|
| 7,649,804 B2 * | 1/2010 | Sinha | 367/35 |
| 7,813,220 B2 | 10/2010 | Kanaya et al. | |
| 7,950,451 B2 * | 5/2011 | Alberty | 166/250.01 |
| 8,193,946 B2 * | 6/2012 | Sinanovic et al. | 340/855.4 |
| 2003/0218939 A1 | 11/2003 | Casarsa et al. | |
| 2004/0238266 A1 | 12/2004 | West et al. | |
| 2007/0215345 A1 | 9/2007 | Lafferty et al. | |
| 2009/0238043 A1 | 9/2009 | Kamata et al. | |

FOREIGN PATENT DOCUMENTS

| | | |
|---|---|---|
| WO | 01/99028 | 12/2001 |
| WO | 02/068996 | 9/2002 |
| WO | 2007/105167 | 9/2007 |
| WO | 2007/118210 | 10/2007 |
| WO | 2009/089423 | 7/2009 |

* cited by examiner

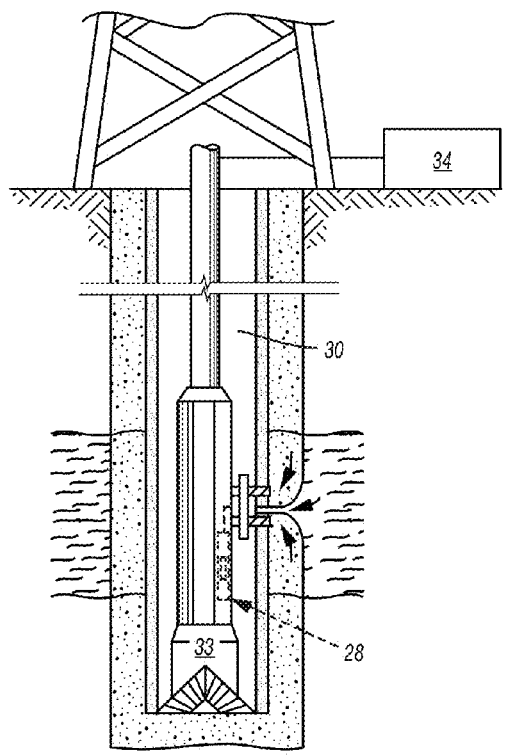
FIG. 1.1
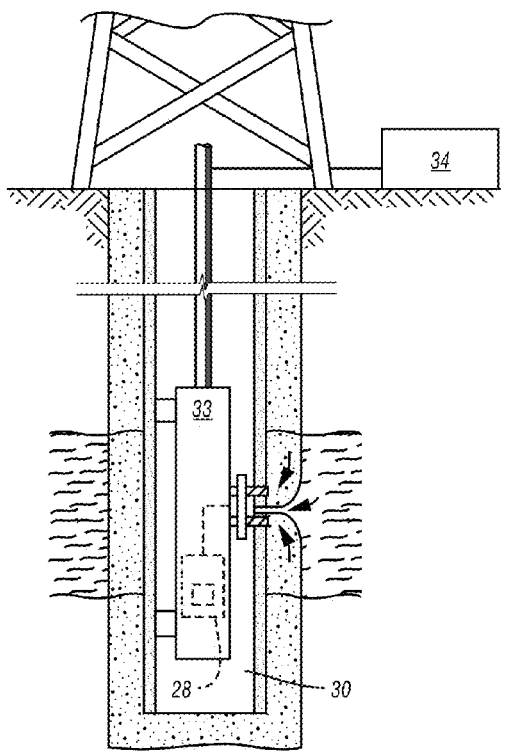
FIG. 1.2
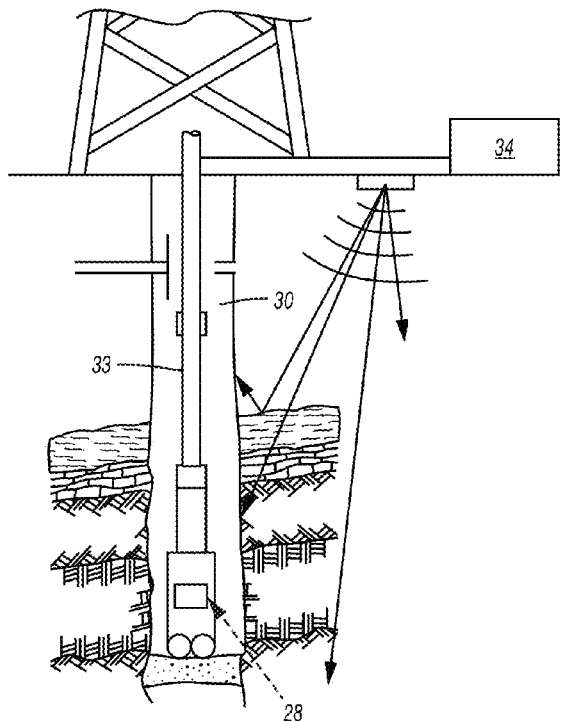
FIG. 1.3
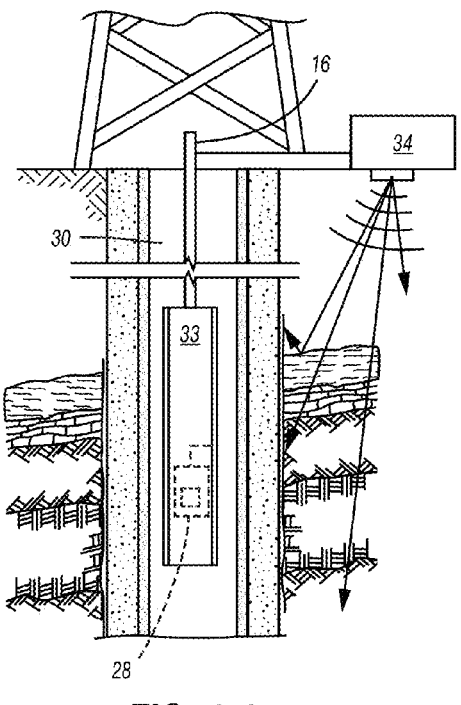
FIG. 1.4

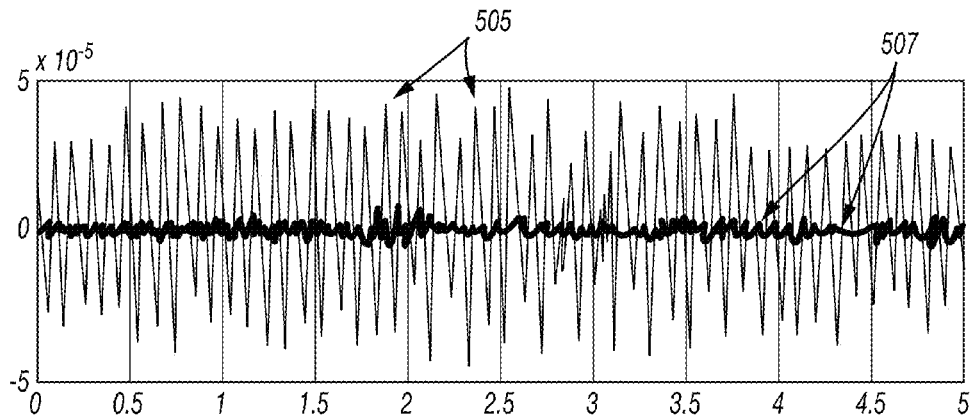
FIG. 5
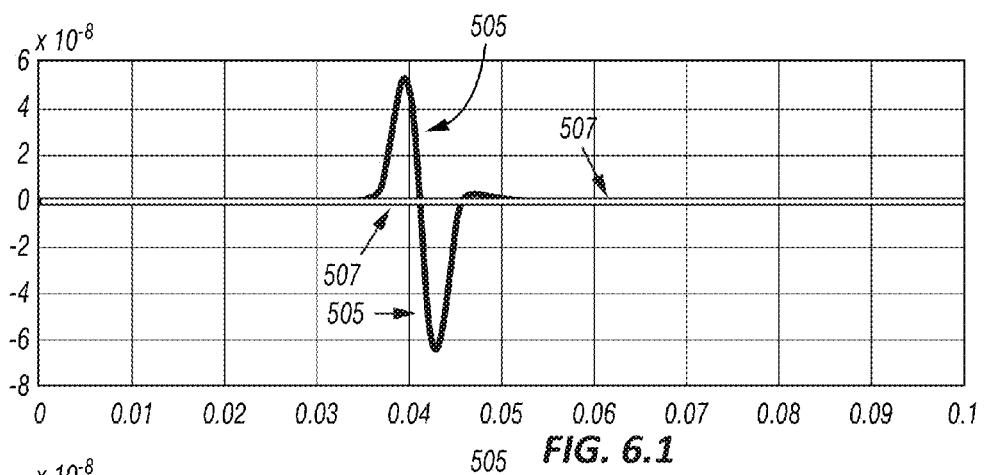
FIG. 6.1
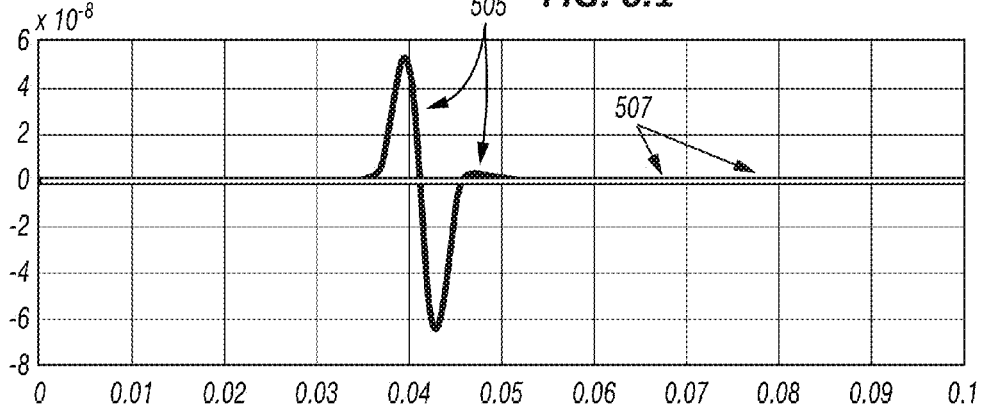
FIG. 6.2

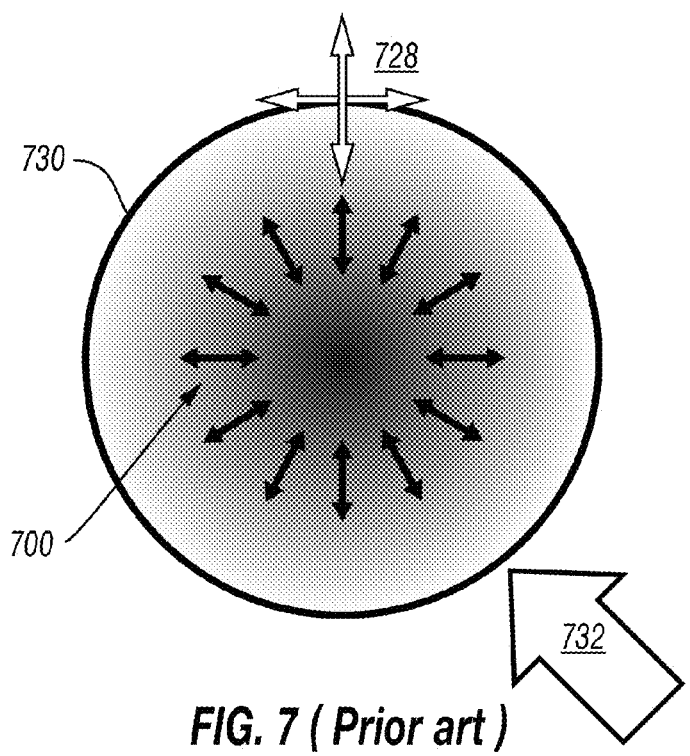
FIG. 7 *(Prior art)*
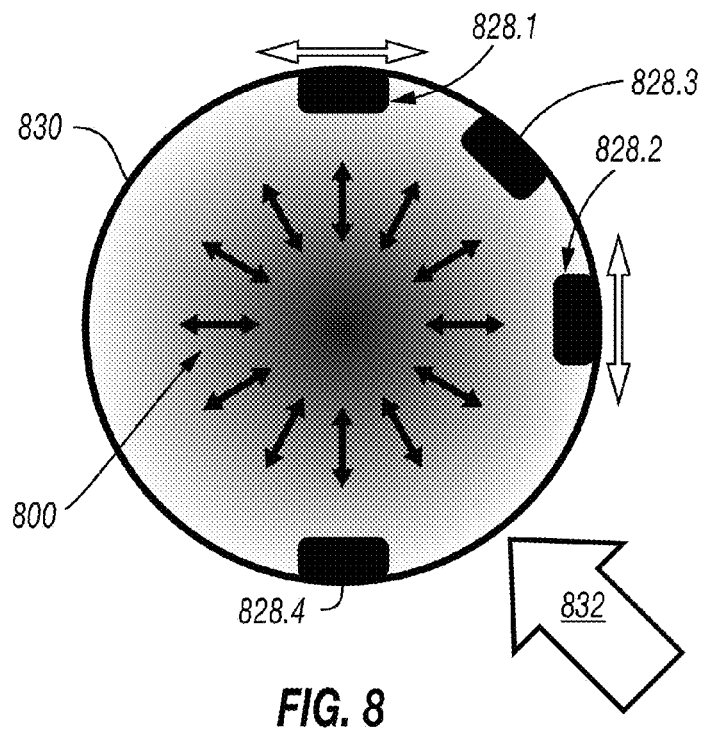
FIG. 8

WELLBORE SIGNAL MONITOR WITH TANGENTIAL SEISMIC SENSORS FOR TUBE-WAVE NOISE REDUCTION

BACKGROUND

The present disclosure relates to wellbore signal monitoring devices and techniques. More specifically, the present disclosure relates to the positioning of seismic sensors on or near drill tools for optimizing monitored signals by reducing unwanted tube-wave noise.

In the measurement of seismic signals originating from outside of a wellbore, multi-component seismic sensors may be positioned within the wellbore for microseismic monitoring, seismic surveying, and permanent monitoring. A sampling of seismic techniques is provided in WO2007105167, entitled "Method and Apparatus for Hydraulic Fracturing and Monitoring," U.S. Pat. No. 5,503,225, entitled "System and Method for Monitoring the Location of Fractures in Earth Formations," WO1989007774, entitled "Method for Vertical-Seismic Profiling in Wells," U.S. Pat. No. 7,813,220, entitled "Method and Apparatus for Long Term Seismic Monitoring," and U.S. Pat. No. 6,981,550, entitled "Sonde."

Tube waves may be present during seismic operations, and may affect wellbore signal surveys. When the tube wave is present in the wellbore, the signal-to-noise (S/N) ratio of the signal of interest as received by seismic sensors within the wellbore may be deteriorated.

Seismic sensors used for signal monitoring within a wellbore may be housed in one package elongated to an axial direction for insertion and use within the wellbore. Techniques related to sensor packaging are provided in WO2001099028, entitled "Orthogonal Triaxial Acoustic Receiver," WO2002068996, entitled "Seismic Detection Using 4-Sensors," and U.S. Pat. No. 6,981,550, entitled "Sonde." With regard to such axial orientations, the direction of motion of the tube wave may have strong radial components that may propagate axially within the wellbore. In other words, unwanted tube wave energy may be excited in the radial direction. The tube-wave energy may also be excited to a lesser extent in the tangential and axial directions. Attempts may be made to reduce the tube-tube wave noise and to enhance signal quality in connection with wellbore signal monitoring processes. Techniques pertaining to tube-wave noise reduction in a borehole are provided in WO2000075694, entitled "Acoustic Isolator for Downhole Applications," WO2007118210, entitled "Improved Performance of Permanently Installed Tubing Conveyed Seismic Arrays Using Passive Acoustic Absorbers," US20040238266, entitled "Methods and Apparatus of Suppressing Tube Waves within a Bore Hole and Seismic Surveying Systems Incorporating Same," and U.S. Pat. No. 6,181,642, entitled "Apparatus and Method for Borehole Seismic Exploration." Packing the seismic sensors into one package elongated to the axial direction may result in retaining of the radial component of the tube-noise wave field for three-component monitoring.

SUMMARY

In at least one aspect, the disclosure relates to an assembly positionable in a wellbore penetrating a subterranean formation. The assembly includes a downhole tool having a housing with a perimeter and a longitudinal axis, and a plurality seismic sensors positioned about the perimeter and coupled to a signal measurer for providing three-component seismic signal measurement within the wellbore. Each of at least two of the seismic sensors are located at a different azimuthal angle relative to one another and are oriented tangentially to the longitudinal axis so as to receive tangential components of wellbore seismic signals to an exclusion of longitudinal and radial components of the wellbore seismic signals.

In another aspect, the disclosure relates to a sensor array positionable in a wellbore penetrating a subterranean formation. The sensor array includes a plurality of seismic sensors disposable about a perimeter of the wellbore and coupleable to a signal measurer with so as to provide three-component seismic signal measurement within the wellbore. At least two of the seismic sensors are located at different azimuthal angles relative to one another and are oriented tangentially to a longitudinal axis of the wellbore so as to receive tangential components of wellbore seismic signals to the exclusion of longitudinal and radial components of the wellbore seismic signals.

Finally, in another aspect, the disclosure relates to a method of monitoring downhole parameters in a wellbore penetrating a subterranean formation. The method involves deploying a downhole tool into the wellbore. The downhole tool has a housing with a perimeter along an outer surface thereof, and at least one seismic sensor package positionable along a depth of the downhole tool. The seismic sensor package includes seismic sensors positioned about the perimeter of the housing in tangential rather than radial or vertical orientations. The method also involves receiving seismic signals with the at least one seismic sensor package, and measuring seismic parameters from the seismic signals.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for accomplishing a wellbore signal monitor with tangential seismic sensors for tube-wave noise reduction are described with reference to the following figures. Like numbers are used throughout the figures to reference like features and components.

FIGS. 1.1 to 1.4 are schematic environment views of wellbore implementations illustrating logging while drilling (LWD), wireline, coiled tubing, and permanent borehole seismic monitoring applications, respectively, with inventive tube-wave attenuating seismic sensors installed therein in accordance with the present disclosure;

FIG. 5 is a graph illustrating a waveform of tube-wave pump noise, a tube wave being dominant at the radial component, in accordance with the present disclosure;

FIGS. 6.1 and 6.2 are graphs illustrating modeling waveforms in which, at both seismic sensor positions, an amplitude of the tangential component is smaller than that of a radial component, in accordance with the present disclosure;

FIG. 7 is a schematic diagram illustrating a conventional geophone layout in which sensors are held in one sensor package, a radial component of the geophone(s) being in-line with a direction of motion of a tube wave;

FIG. 8 is a schematic diagram illustrating tangentially-oriented seismic sensors in accordance with the present disclosure;

DETAILED DESCRIPTION

Figure 2:
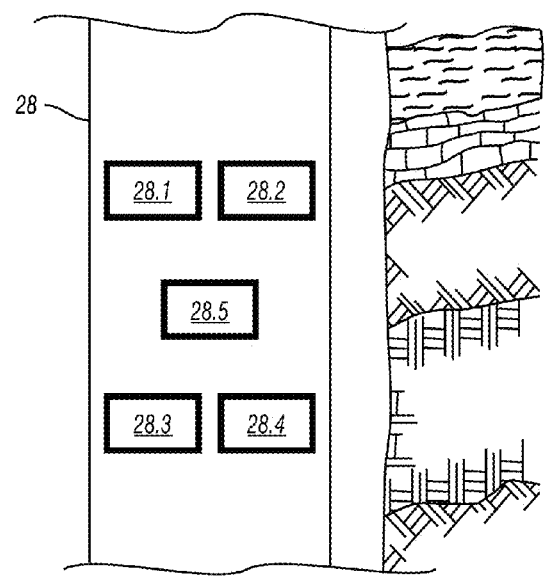
FIG. 2 is a schematic diagram illustrating a magnified view of one or more of the preceding figures, showing a seismic sensor layout for wellbore seismic measurement in accordance with the present disclosure.

In the following description, numerous details are set forth to provide an understanding of the present disclosure. However, it will be understood by those skilled in the art that the present disclosure may be practiced without these details and that numerous variations or modifications from the described embodiments are possible.

A signal monitoring system according to the present disclosure is positionable in a wellbore, which penetrates a subterranean formation, the system comprising one or more sensor packages which, in turn, comprise seismic sensors. The seismic sensors are positioned on or in proximity to a downhole tool in ways to reduce unwanted tube-wave energy components of a seismic signal to be monitored. The system can be configured with the sensor package(s) uniquely positioning (e.g., disposing in tangentially-oriented fashion) seismic sensors at different azimuthal positions/angles on or in proximity to the downhole tool within the wellbore. In one implementation, the seismic sensors can be held by the sensor package uniquely positioned at locations and orientations in well bores to reduce unwanted tube-waveform components by way of a signal measurer (e.g., a microprocessor, or application specific integrated circuit (ASIC)). The wellbore-situated, tangentially-orientated seismic sensors seek to enable multi-component seismic signal monitoring with a tube-wave energy component (e.g., radial component) that is reduced relative to reductions in axial and tangential components of the tube wave.

The sensor array has tangentially-oriented, azimuthally-different seismic sensors for use with a downhole tool in a wellbore. The seismic sensors are provided with tangential orientations, as compared to radial or axial orientations, to enable a method of multi-component seismic signal monitoring with a reduced tube-wave radial component in the signal being monitored. In one implementation, two or more of the tangentially-oriented, azimuthally-different seismic sensors, and an additional seismic sensor, together can be configured to be in communication with a signal measurer for enabling three-component seismic signal monitoring. Another implementation uses three or more of the tangentially-oriented, azimuthally-different seismic sensors in communication with a signal measurer for enabling three-component seismic signal monitoring.

The disclosure concerns measurement of seismic signals impinging from outside of a wellbore, such as during seismic surveillance, microseismic monitoring, permanent seismic monitoring, and other sorts of seismic measurement pursuits especially while performing drilling-related operations. A common application involves using multi-component seismic sensors for performing such measuring in a wellbore. The seismic sensors can take the form of geophones, accelerometers, and similar devices. The tube wave is prevalent in a wellbore, and may cause the signal-to-noise (S/N) ratio of the signal of interest to deteriorate.

The tube-wave energy may be excited in the radial direction. Energy of the tangential and axial components may be smaller in magnitude than the radial component. The present disclosure seeks to attenuate or eliminate the radial component from the measurement. To the extent the disclosure demonstrates material and substantial capabilities of reducing the tube-wave energy in the radial direction, the energy of the tube wave in the seismic sensors may be reduced.

The discovered idea of this disclosure is to place the seismic sensors so as to be aligned in tangential directions relative to the wellbore, whereby a seismic-sensor assembly may be less sensitive to tube-wave noise than the when alignment of the seismic sensor(s) is in the radial direction(s).

According to an aspect of the disclosure, two or more of the seismic sensors may be arranged in tangentially-oriented fashions about the wellbore, at different azimuthal locations about the wellbore. For instance, two seismic sensors can be arranged at distinct locations, tangentially-oriented relative to a center region of the wellbore, and further can be disposed at different azimuthal locations about the wellbore axis. In a nominal case, two seismic monitors are disposed about the wellbore axis, separated by an azimuthal angle of about 90 degrees. The positions of attachment of the seismic sensors in the wellbore in some regards can be arbitrary, such as on the wellbore wall, or even in a general vicinity of the wellbore, depending for example on the survey/surveillance being implemented. This seismic sensor configuration may be used to reduce the tube-wave energy in the waveform while holding reliable results for the three-component monitoring. The seismic sensors and the additional seismic sensor may be configured to be in communication with a signal measurer for enabling multi-component seismic signal monitoring.

The systems and methods of the present disclosure have applicability in many arena of wellbore seismic measuring, including various sorts of wellbore seismic surveillance, microseismic monitoring, permanent seismic monitoring, and related activities.

FIGS. 1.1 to 1.4 elucidate sundry wellsite schematics of contemplated applicability, amongst others, of the tube-wave attenuating seismic sensors. In each depiction, multiple seismic sensors, cf. 28, are positioned or installed within a wellbore 30 for facilitating wellbore or downhole seismic surveying (e.g., seismics), such as in the context of single well seismic and cross-well seismics. Multiple seismic sensory, for instance, can be performed via the placement of seismic sensors in the wellbore for recordation of the seismic wave field due to a seismic source at another location in the same wellbore, at the surface, or in another borehole.

In the domain of logging while drilling (LWD), seismic sensors, cf. 28 operate to acquire seismic data for geosteering, e.g. a drilling tool 33, cf. FIGS. 1.1 and 1.2, and/or formation evaluation. The seismic sensors may have applicability to wireline aspects or tubing-conveyed device (e.g., coiled tubing) aspects of logging, cf. FIG. 1.4, that employ electrical cable and/or piping to lower drilling tools into wellbores to collect and transmit seismic data via the seismic sensors 28 and one or more signal measurers. A signal measurer can take the form of a downhole telemetry module, cf. 28, in communication with an optional surface telemetry module 34. Other applications contemplated to benefit from the seismic sensors encompass endeavors entailing related and associated wellbore interventions (e.g., hydrofracturing monitoring) and equipment (e.g., hard, steel tubing). In the context sundry, well-intervention methods standing as candidates to benefit from the coiled-tubing techniques, for instance, cf. FIG. 1.3, can be updated to employ the seismic sensors under live well conditions.

Combinations of the aforesaid types of applications can include installing electrical conductors or hydraulic conduits to further enhance the capability (e.g., of a coiled-tubing string) and enable relatively complex intervention techniques. Another intervention standing to benefit from the seismic-sensor technology discovered and reported herein is permanent borehole seismic monitoring, in which the wellbore and/or reservoir are continuously monitored and on the basis of such information wellbore completion is adjusted (e.g., remotely) responsive to changes in downhole conditions. Permanent well monitoring systems as contemplated herein can be composed of the downhole seismic sensors, cf. 28, of the disclosure along with one or more of inflow control valves that enable choking or shutting-off of different zones according to performance such as drawdown, gas/oil ratio (GOR) or water cut, other downhole sensors with capacity for measuring one or more of pressure, fluid flow rate and temperature, and control lines for power transmission and transferring of monitored downhole data captured by downhole sensors such as the seismic sensors, with a surface control unit 34 to handle the monitored data and for remote operation of downhole inflow control valves.

As articulated herein, methods and architectural arrangements of seismic sensors for use in applications including the above are directed at enhancing seismic-signal quality by attenuating, in particular, a radial component of tube-wave noise of a given seismic signal under observation.

FIG. 2 depicts a schematic assembly of three seismic sensors 28.1, 28.2 and 28.3 according to the present disclosure arranged for providing three-component seismic signal measurement while attenuating tube-wave noise. The seismic sensors may be suited and configured for operation within or in connection with a drilling tool 33, and accordingly may be coupled with a downhole telemetry module 28.4 of a signal measurer whereby multi-component (e.g., three-component) measurement and monitoring of seismic signals can be performed from within the wellbore 30. At least two of the seismic sensors, e.g., 28.1 and 28.2, are arranged with a tangential orientation to a central region of the wellbore, thereby to avoid radially-travelling tube-wave noise, as will be discussed below. In the illustrations, the number of seismic sensors can exceed three, and, although shown within a sensor package 28, the assembly need not be limited to such types of physical attachment or association.

Figure 3:
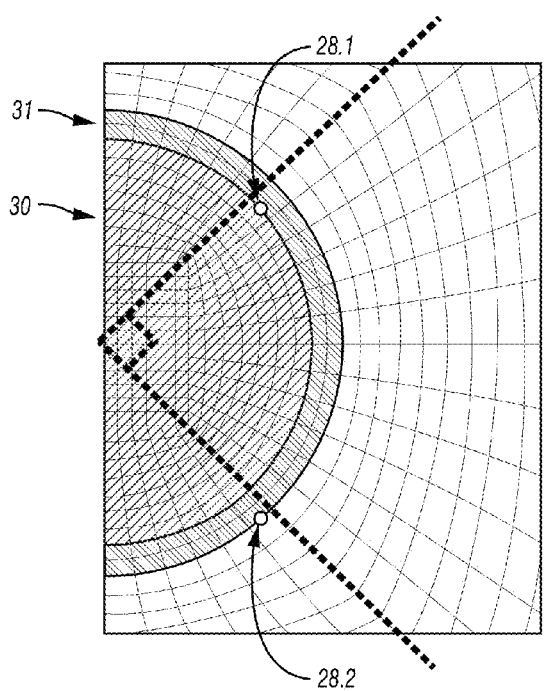
FIGS. 3 and 4 are schematic diagrams illustrating a three-dimensional waveform modeling setup for a synthetic tube-wave computation in accordance with the present disclosure.
Figure 4:
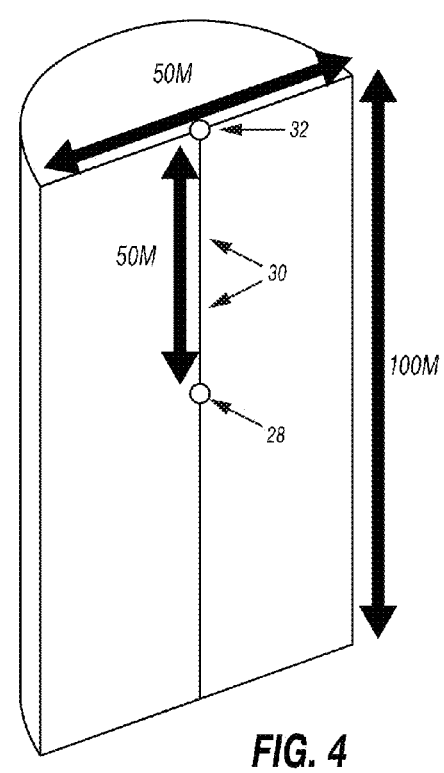

FIGS. 3 and 4 correspond to a three-dimensional waveform modeling setup for a synthetic tube-wave computation. Turning to FIG. 3, two of the seismic sensors, e.g., geophone 28.1 and geophone 28.2, can be arranged as shown at distinct locations, tangentially-oriented relative to a central region (axis) of the wellbore, and further can be disposed at different azimuthal locations about the wellbore axis. According to the simulation/computation, the geophones 28.1 and 28.2 are provided inside of a casing 31 at a first monitoring point and a second monitoring point. In a nominal case, two seismic monitors are disposed about the wellbore axis, separated by an azimuthal angle of about 90 degrees.

In another aspect of the present disclosure, with reference to FIG. 4, at least one of the above-described arrangements 28 of geophones is incorporated into a downhole tool which, in operation, is lowered into the wellbore 30 and responsive to a source 32. The distance between adjacent, tangentially-oriented geophone arrangements (cf., FIG. 3) may vary from about 0.10 m to about 30.00 m, for example, depending on characteristics, such as the desired resolution of the seismic measurement. The number of arrangements may vary depending on the specific circumstances of the acquisition being pursued. Also, one or more of the plurality of arrangements comprising different types of geophones or geophone arrangements may be provided at different locations on or about the sensor packaging and/or drilling tool.

In other embodiments, the arrangements of geophones can be combined with attenuators 28.5 (FIG. 2) for acoustic waves so as further to reduce noise of seismic signals.

Three-component measurement may be provided for seismic-signal measurement. For example, microseismic monitoring may utilize both the arrival time and incident angle of primary/pressure (P) and secondary/shear (S) waves to locate events. This may involve the use of a three-component waveform. On top of these signals of interest, a tube wave may be present in the wavefield as an additive noise. Thus, the reduction of the tube-wave energy may be considered for seismic-data processing.

Three-component measurement may be accomplished by way of a single sensor package with the installation of three or more sensors at different (i.e., x, y, z, or radial, tangential and vertical component) orientations, and at the same azimuthal location within the single sensor package. The layout with respect to two such seismic sensors, corresponding for instance to the depiction of seismic sensors 28.1 and 28.2 in FIG. 2, is shown in FIG. 7. In this layout, within a borehole 730 there is one sensor package 728 at a particular azimuth, e.g., twelve o'clock. Impinging energy 732 from an external signal is combined with unwanted radial components 700 of tube wave energy. In order to keep the three-component measurement, an assembly of three geophones is composed, one each, of radial (cf. 728), tangential (cf. 728) and vertical (not shown) component geophone orientations from the viewpoint of the cylindrical coordinate system.

The pressure field associated with the tube wave may be omni-directional in a circular wellbore (cf., FIG. 7). This omni-directional pressurization may result in a tendency for the energy of the tube wave to be dominant, in particular, in the radial direction.

In accordance with a feature of the present disclosure, the tube-wave energy may be excited at the radial direction. Additionally, energy of the tangential and axial components may also be present, and may be smaller in magnitude than the radial component. The sensor herein may be configured to reduce the impact of the radial component on the measurement.

In fact, the amplitude of the tube wave may be expected and determined herein to be smaller in the tangential and vertical directions than in the radial direction. From this nature of the polarization of the tube wave and the FIG. 7 seismic-sensor layout, the energy of the tube wave may be contained in the waveform. At the radial component, signal-to-noise ratio (S/N) may be worse compared with other components. The tube-wave energy at the radial component may be reduced to enhance data quality.

Turning to FIG. 8, two or more of the seismic sensors, e.g. geophone #1 (828.1) and geophone #2 (828.2), can be arranged in tangentially-oriented fashions about a center or axial region of the wellbore 830. The seismic sensors are disposed at different azimuthal locations about the wellbore. For instance, at least two of a set of seismic sensors (e.g., geophone #1 and geophone #2, in one or more sensor packages) can be disposed at a 90 degree azimuthal separation, with a third seismic sensor (not shown) operatively coupled thereto, so as to retain the capability of three-component monitoring in the wellbore. In the figure, within the wellbore 830 multiple seismic sensors, cf. 828.1 and 828.2, are positioned to provide multi-component monitoring in relation to an external signal 832 which combines with interfering radial components 800 of tube wave energy.

The geophones may include directionally selective or anisotropic transducers (e.g., one-component (1C) geophones) which convert seismic energy into a signal suitable for further processing, e.g., transducers based on the principle of a moving coil or solid state or other accelerometer. A geophone as used herein can comprise, for instance, a housing having a filling fluid therein, bobbin supported in the housing, a coil disposed about the bobbin and a magnet disposed about the bobbin a distance from the coil, in which one of the coil and the magnet is operatively connectable to the bobbin by a spring. Descriptions of geophones are provided in U.S. patent application Ser. No. 2009/0238043, the entire contents of which is hereby incorporated by reference herein. Also included within the scope of the disclosure can be transducers which are, for example, sensitive to two or three independent directions in space, such as two-component (2C) geophones.

The positions of attachment of the seismic sensors in some regards can be arbitrary (e.g., depending for example on the particular application of survey/surveillance), such as on the wellbore wall, in the vicinity of the wellbore such as inside the cement behind casing, inside the wellbore such as on the tubing, or on the drill string or in the fluid annulus, and so forth.

This seismic sensor may be configured to reduce the tube-wave energy in the waveform while holding the three-component monitoring.

The field data in FIG. 7 exhibits a feature in which the energy of the pump noise is concentrated to the radial direction. At the tangential direction, the amplitude is smaller in comparison with the radial component. For this problem, this disclosure suggests a way to exempt the radial component while holding the three-component measurement. The geophones may be placed at the tangential directions of different azimuths.

A minimum number of tangential geophones for two-component monitoring may, according to some aspects of the disclosure, be two, as shown by sensors 828.1 and 828.2 in FIG. 8. In some cases, the positioning and numbering can be more than two according to other aspects of the disclosure, such as reflected by the sensors (e.g., geophones) 828.3 and 828.4 shown in phantom in the same figure.

The tangential orientation of each geophone in FIG. 8 can be in a tangential direction on the perimeter that is in a cross-sectional plane of the wellbore and that is perpendicular to a longitudinal direction of the wellbore. According to the configuration, the tangential geophones may enable two-component monitoring, yet may not contain the axial component used for three-component monitoring. Incorporating more tangential geophones in the cross-sectional plane of the wellbore may not enable more than a two-component measurement. A three-component measurement may be enabled by providing an axial component which can take the form of at least one geophone oriented in the axial (e.g., longitudinal) direction.

The geophones can be at about the same axial height. In some embodiments, the axial height may be varied so long as three-component monitoring can be performed. In case that the number of geophones oriented to the tangential direction is greater than two, then three-component wavefield energy can be reconstructed by means of the coordinate axis rotation, or singular value decomposition method and so on. Here, it may be the case, according to certain embodiments, for at least one of the geophones (e.g., 28.3 in FIG. 2) to be at a different axial height with respect to the others. The azimuthal offset can be any in this case.

The geophones may be oriented in the tangential directions to avoid the radial component measurement for the sake of reducing the tube-wave energy.

According to the embodiment as portrayed geometrically in FIG. 8, the two geophones 828.1 and 828.2 are installed on the casing with about 90 degrees of azimuthal offset. While a 90 degree offset may be optimal or ideal in some regards for reducing tube wave energy, in principle, it may be possible to construct orthogonal components from non-90 degree azimuthal offsets. For example, it may be possible with about a 45 degree offset to construct the two tangential components into an orthogonal component by way of a relatively straightforward coordinate system transform. Hence, with modified embodiments the azimuthal offset between seismic sensors can comprise other values such as, to name a few, the mentioned 45 degrees, or 135 degrees, cf. sensors 828*c* and 828*d*, or, according to other modified embodiments, most any azimuthal offset other than 0 or 180 degrees. These geophones are oriented to the tangential direction. Due to the azimuthal offset of the two geophones, two horizontal component measurements are retained. Upon the addition of one more geophone for the vertical component measurement, three-component measurements are realized without having the radial component. This layout may be used to reduce the amount of tube wave out of the waveform.

Spatial offset between the sensors at distinct positions may not be considered for the data processing. This is because such spatial offset may be, at most, geometrically/dimensionally comparable to the wellbore diameter, while the wavelength of the target waveform survey scale may be greater than this spatial offset of the sensors or sensor package(s). From these considerations, for data processing, minimal negative impact may be anticipated for the spatial offset of the seismic sensors along or about a circle/perimeter of the wellbore.

To demonstrate the concept, waveform modeling was performed with the setup defined pursuant to that exhibited in FIGS. 3 and 4, supra. As in FIG. 8, two geophones were placed with 90 degrees of azimuthal offset. As seen in FIGS. 5 and 6, the amplitude of the tangential component in the wellbore 30 may be smaller than that of the radial component. In greater detail, the plots in FIG. 5, comprising an x-axis of time in seconds and a y-axis of velocity in meters/second, show a waveform of tube-wave pump noise, the tube wave being dominant at the radial component 505, shown in grey, as compared to the tangential component 507, shown in black.

FIGS. 6.1 and 6.2 shows detailed (e.g., time-axis expanded) modeled waveforms at the first and second monitoring points of FIG. 3. Each x-axis portrays time in seconds and each y-axis corresponds to velocity in meters/second. The tube-wave pump noise for the first monitoring point is shown in the upper plot, and that for the second monitoring point is laid out in the lower plot. Each of the plots in FIGS. 6.1 and 6.2 show in detail how the tube wave is dominant at the radial component 505, shown in dark grey, as compared to the tangential component 507, shown in light grey. As with the plot of FIG. 5, here, for both seismic sensor positions the amplitude of the tangential component 507 is smaller (e.g., significantly or substantially smaller according to that described and depicted herein) than that of the radial component 505.

Using this information, three-component measurement can be engineered without the radial component. Such a layout becomes highly effective at reducing/removing the energy of tube wave out of the waveform.

In reference to the above content such as discussed with reference to FIGS. 3 and 8, the concept of the present disclosure has been explained with the particular permutation of two geophones at 90 degrees of azimuthal offset. However, this idea is conceptually applicable not only for that particular layout, but also is valid for other numbers of geophones greater than two along the circle of the wellbore with more arbitrary (different) azimuthal offsets.

Figure 9:
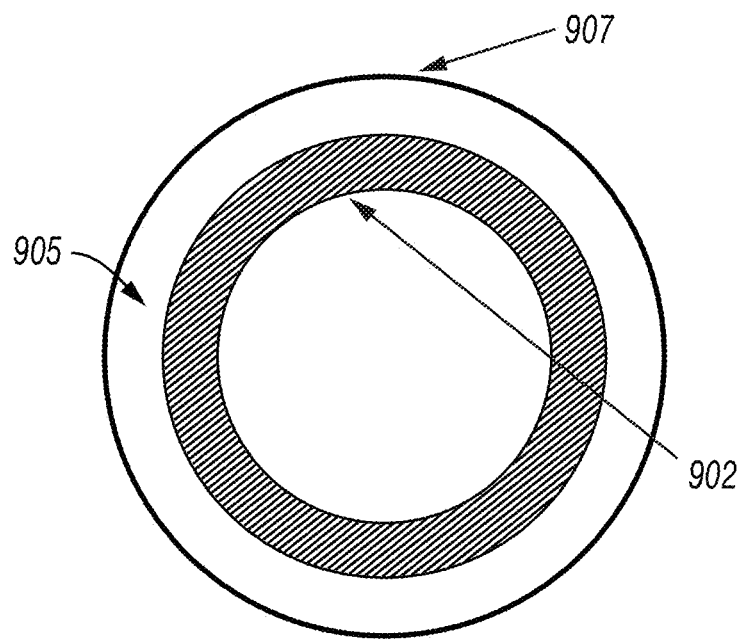
FIG. 9 is a schematic diagram illustrating seismic sensor placements on an inner rim of a casing, in cement behind the casing, and on a perimeter of the formation.
Figure 10:
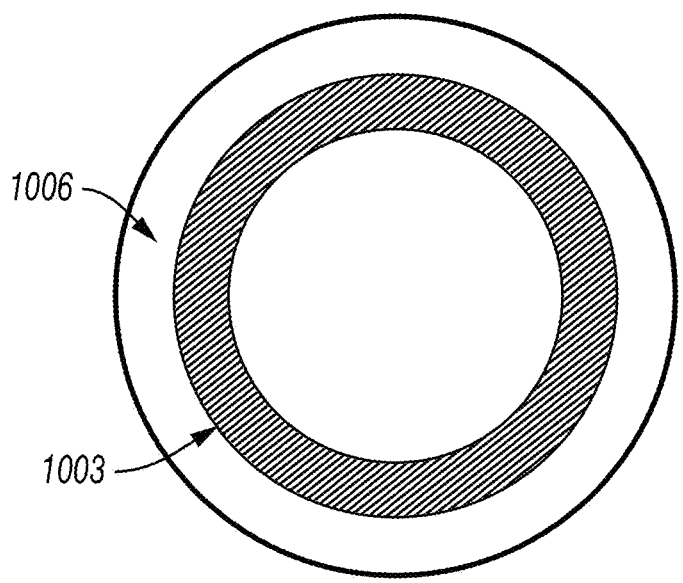
FIG. 10 is a schematic diagram illustrating seismic sensor placements in a fluid annulus and on an outer rim of a tubing or tool string in accordance with the present disclosure.

In terms of the sensor placement, the present disclosure is applicable at most any place in and in the vicinity of the wellbore. Placement of the seismic sensors are reflected in the arrangements of FIG. 9 and FIG. 10. For example, the sensors may be placed about the wellbore wall such as the casing, e.g., on the inner rim 902 of the casing. The sensors may also be placed behind the casing, e.g., inside the cement such as at 905. The sensors may also be placed on the tubing, e.g., on the outer rim 1003 of the tubing. Furthermore, the placement may be applicable for drilling and measurement applications for wellbore seismic where the drill string is present in the wellbore. For example, it is possible to place sensors on the rim of the drill string, cf. 1003, such as the drill collar, and/or in the fluid annulus 1006, inside the drill collar, and so forth. More generally, the seismic sensors of the disclosure can be positioned on one or more of the wellbore wall and a vicinity of the wellbore such as on the perimeter of the formation 907. These placements of the seismic sensors can correspond to arrangements such as those of FIG. 9 and FIG. 10.

In terms of the range of application of this noise-reducing approach, the disclosure is conceptually applicable to any wellbore seismic measurement. For example, any sort of wellbore seismic surveying, such as three-dimensional vertical seismic profile (VSP), any sort of microseismic monitoring, such as for the hydrofracturing monitoring, and permanent seismic monitoring.

Figure 11:
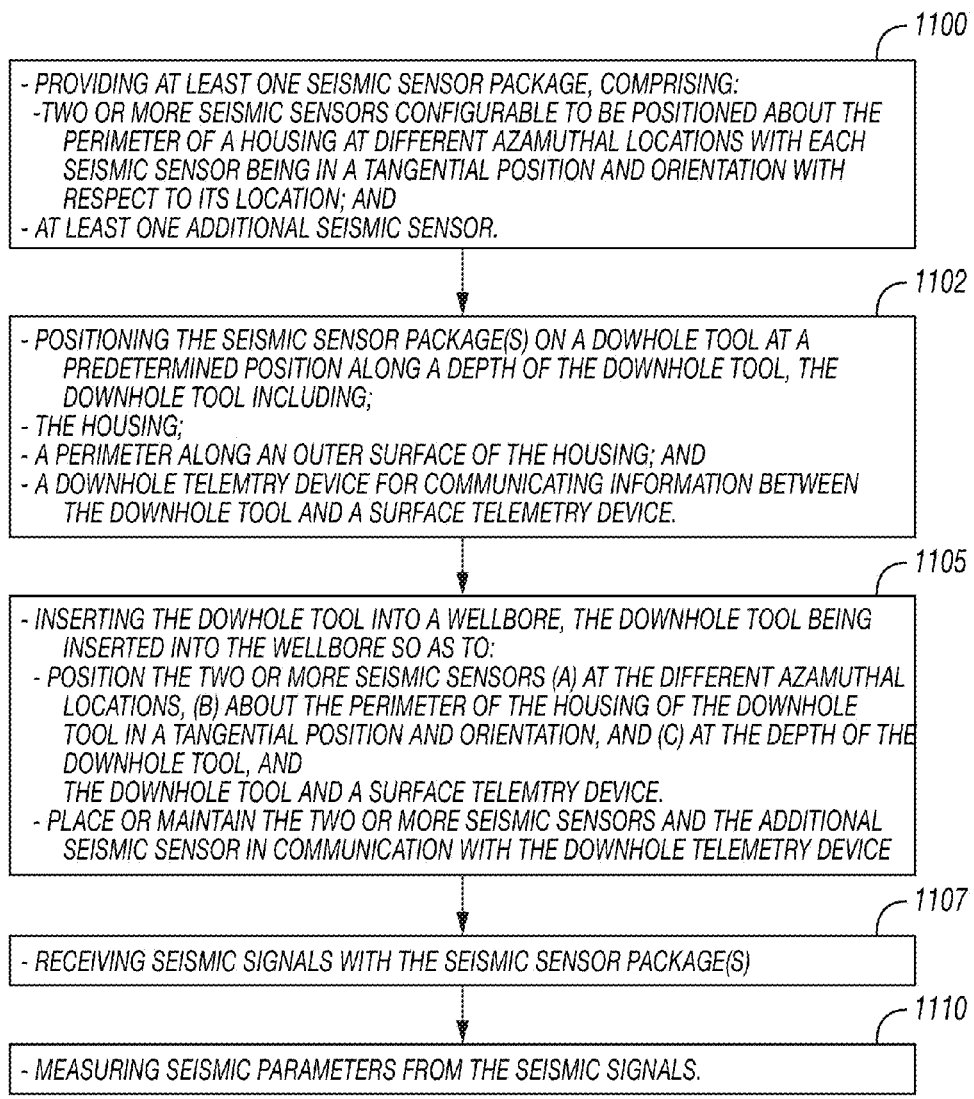
FIG. 11 is a flow chart depicting a method of attenuating tube-wave noise in accordance with the present disclosure.

With reference to the flow chart shown in FIG. 11, a method for implementing principles of the disclosure can comprise, for example, 1100—providing at least one seismic sensor package. The sensor package, in turn, can comprise two or more seismic sensors configurable to be positioned about the perimeter of a housing at different azimuthal locations with each seismic sensor being in a tangential position and orientation with respect to its location, and can further comprise at least one additional seismic sensor. The method may also involve 1102—positioning the seismic sensor package or packages on a downhole tool at a predetermined position along a depth of the downhole tool, the downhole tool including the housing, a perimeter along an outer surface of the housing, and a downhole telemetry device for communicating information between the downhole tool and a surface telemetry device. The method may also involve 1105—inserting the downhole tool into a wellbore so as to position the two or more seismic sensors (a) at the different azimuthal locations, (b) about the perimeter of the housing of the downhole tool in a tangential position and orientation, and (c) at about the depth of the downhole tool. Thereafter, the method involves placing or maintaining the two or more seismic sensors and the additional seismic sensor in communication with the downhole telemetry device. The method further may also involve 1107—receiving seismic signals with the seismic sensor package or packages, and 1110—measuring seismic parameters from the seismic signals.

Various modifications to the method can be made while not departing from the scope of the disclosure. For instance, another method of monitoring downhole parameters in a wellbore penetrating a subterranean formation can comprise (1) deploying a downhole tool into the wellbore, the downhole tool having a housing with a perimeter along an outer surface thereof, and at least one seismic sensor package positionable along a depth of the downhole tool, comprising seismic sensors positioned about a perimeter of the housing in tangential rather than radial or vertical orientations, (2) receiving seismic signals with the at least one seismic sensor package, and (3) measuring seismic parameters from the seismic signals. The downhole tool can comprise a downhole telemetry module communicating with a surface telemetry module via a wireline cable, and the method can further comprise reducing a radial component of tube-wave energy to a greater extent relative to a reducing of tangential and axial components of the tube-wave energy as a consequence of the tangential orientations of the seismic sensors, via, for instance, seismic sensors provided as at least two geophones with about 90 degrees azimuthal offset.

As a summary, the disclosure suggests, for the sake of any sort of wellbore seismic measurement, the concept of effective seismic sensor layout to reduce the tube wave by avoiding the radial component while retaining the three-component measurement.

Although a few embodiments have been described in detail above, those skilled in the art will readily appreciate that other embodiments and many modifications in the embodiments are possible without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An assembly positionable in a wellbore penetrating a subterranean formation, the assembly comprising:
    a downhole tool having a housing with a perimeter and a longitudinal axis;
    a plurality seismic sensors positioned about the perimeter and coupled to a signal measurer with a configuration to provide three-component seismic signal measurement within the wellbore, each of at least two of the plurality of seismic sensors being located at a different azimuthal angle relative to one another and being oriented tangentially to the longitudinal axis so as to receive tangential components of wellbore seismic signals to an exclusion of longitudinal and radial components of the wellbore seismic signals.

2. The assembly as set forth in claim 1, comprising a configuration for measuring downhole seismic parameters about the wellbore within the subterranean formation, with each of the plurality of seismic sensors comprising a geophone in close proximity to the downhole tool positionable in the wellbore penetrating the subterranean formation.

3. The assembly as set forth in claim 1, wherein at least two of the plurality of seismic sensors are disposed at about a predetermined depth as measured along the longitudinal axis of the downhole tool, and are positioned at about tangential positions to the perimeter of the housing at the different azimuthal angles.

4. The assembly as set forth in claim 1, wherein:
the plurality of seismic sensors comprises an additional seismic sensor that is located at a position along the longitudinal axis that is different from positions of at least two of the plurality of seismic sensors;
neither of the at least two of the plurality of seismic sensors is elongated in an axial direction; and
the at least two of the plurality of seismic sensors and the additional seismic sensor are configured to be in communication with the signal measurer for enabling the three-component seismic signal measurement.

5. The assembly as set forth in claim 4, in which the at least two of the plurality of seismic sensors and the additional seismic sensor are tangentially oriented, and are configured together to provide three-component wavefield signals to the signal measurer for reconstruction via one or more of coordinate axis rotation, a singular value decomposition method, or a combination thereof.

6. The assembly as set forth in claim 1, wherein the plurality of seismic sensors comprises an additional seismic sensor oriented in a direction substantially parallel to the longitudinal axis, and the at least two of the plurality of seismic sensors and the additional seismic sensor are configured to be in communication with the signal measurer for enabling the three-component seismic signal measurement.

7. The assembly as set forth in claim 1, whereby energy of a tube wave in a radial direction, relative to the energy thereof in the axial and tangential directions, is reduced out of a waveform being monitored via the three-component seismic signal measurement.

8. The assembly as set forth in claim 7, wherein the signal measurer comprises a surface telemetry module and a downhole telemetry module in communication with the surface telemetry module.

9. The assembly as set forth in claim 1, in which the at least two of the plurality of seismic sensors are two geophones with about a 90 degree azimuthal offset.

10. The assembly as set forth in claim 9, in which a tube-wave energy comprises a radial component that is substantially reduced relative to reductions in axial and tangential components of the tube wave.

11. The assembly as set forth in claim 1, in which the plurality of seismic sensors is combined with attenuators for acoustic waves so as to further to reduce noise of the wellbore seismic signals, and an amount of reduction of a radial component of tube-wave energy is greater than any amounts of reduction of tangential and axial components of the tube-wave energy.

12. The assembly as set forth in claim 1, wherein the at least two of the plurality of seismic sensors are positioned on one or more of a wellbore wall, a vicinity of the wellbore on an inner rim of or behind a casing, on tubing inside the wellbore, on a drill string, and in a fluid annulus, and wherein a tube-wave energy has a reduced radial component relative to the tangential component and an axial component of the tube-wave energy as a consequence of tangential orientations of the at least two of the plurality of seismic sensors.

13. A sensor array positionable in a wellbore penetrating a subterranean formation, comprising a plurality of seismic sensors disposable about a perimeter of the wellbore and coupleable to a signal measurer with a configuration to provide three-component seismic signal measurement within the wellbore, at least two of the plurality of seismic sensors being located at different azimuthal angles relative to one another and being oriented tangentially to a longitudinal axis of the wellbore so as to receive tangential components of wellbore seismic signals to the exclusion of longitudinal and radial components of the wellbore seismic signals.

14. The sensor array as set forth in claim 13, in which the plurality of seismic sensors are held by one or more sensor packages.

15. The sensor array as set forth in claim 13, the plurality of seismic sensors comprising an additional seismic sensor that is not oriented parallel to a longitudinal axis.

16. The sensor array as set forth in claim 15, wherein the additional seismic sensor is positioned on the perimeter of the wellbore at a tangential position and in a tangential orientation relative to its position on the perimeter of the wellbore.

17. A method of monitoring downhole parameters in a wellbore penetrating a subterranean formation, the method comprising:
deploying a downhole tool into the wellbore, the downhole tool having:
a housing with a perimeter along an outer surface thereof; and
at least one seismic sensor package positionable along a depth of the downhole tool, comprising seismic sensors positioned about the perimeter of the housing in tangential rather than radial or vertical orientations;
receiving tangential components of seismic signals to an exclusion of longitudinal and radial components of the seismic signals with the at least one seismic sensor package; and
measuring seismic parameters from the tangential components of the seismic signals.

18. The method according to claim 17, the downhole tool further comprising a downhole telemetry module communicating with a surface telemetry module via a wireline cable.

19. The method according to claim 17, comprising reducing a radial component of tube-wave energy to a greater extent relative to any reducing of tangential and axial components of the tube-wave energy as a consequence of the tangential orientations of the seismic sensors.

20. The method according to claim 17, in which the seismic sensors are provided as at least two geophones with about 90 degrees azimuthal offset.

* * * * *